(12) United States Patent
Khateri

(10) Patent No.: US 10,921,201 B2
(45) Date of Patent: Feb. 16, 2021

(54) TRACTOR DRAFT CONTROL TESTING DEVICE

(71) Applicant: Shoresh Khateri, Sanandaj (IR)

(72) Inventor: Shoresh Khateri, Sanandaj (IR)

(*) Notice: Subject to any disclaimer, the term of this patent is extended or adjusted under 35 U.S.C. 154(b) by 0 days.

(21) Appl. No.: 13/954,988

(22) Filed: Jul. 31, 2013

(65) Prior Publication Data

US 2020/0149986 A1    May 14, 2020

(51) Int. Cl.
*G01L 5/13* (2006.01)
*A01B 63/10* (2006.01)

(52) U.S. Cl.
CPC .......... *G01L 5/136* (2013.01); *A01B 63/1006* (2013.01)

(58) Field of Classification Search
CPC .......................... G01L 5/136; A01B 63/1006
USPC ....................................................... 73/862.57
See application file for complete search history.

(56) References Cited

U.S. PATENT DOCUMENTS

| | | | |
|---|---|---|---|
| 7,104,340 B1 * | 9/2006 | Thompson | A01B 59/042 172/677 |
| 2012/0185137 A1 * | 7/2012 | Schedgick | A01B 63/114 701/49 |

* cited by examiner

*Primary Examiner* — Tarun Sinha
(74) *Attorney, Agent, or Firm* — Azadeh Saidi

(57) ABSTRACT

Tractor Draft Control Testing Device has the capability of testing the draft control of hydraulic system of all types of tractors on the production line and final control of tractor-manufacturing companies.

11 Claims, 7 Drawing Sheets

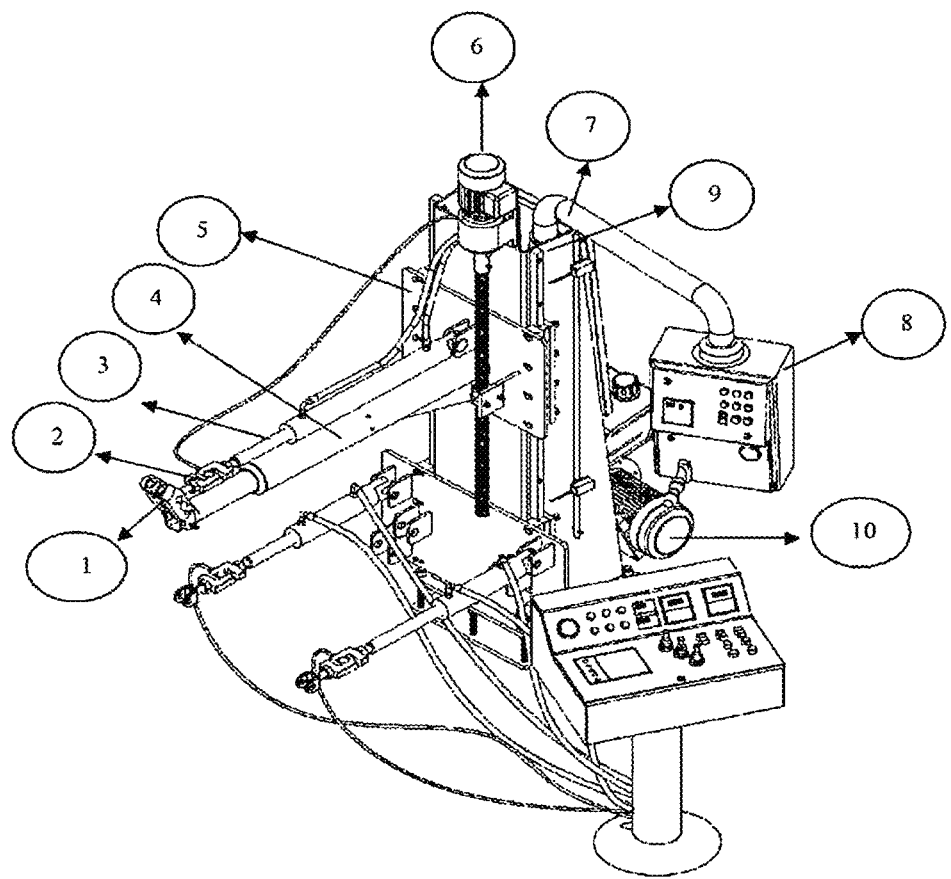
Figure (1-1)

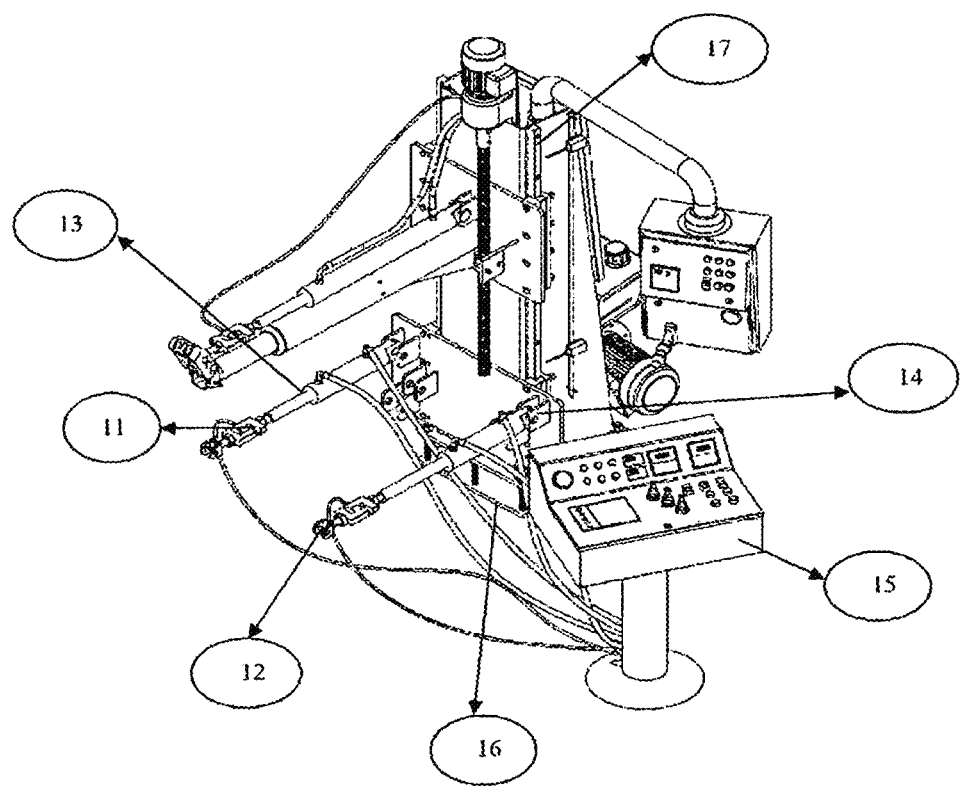
Figure (1-2)

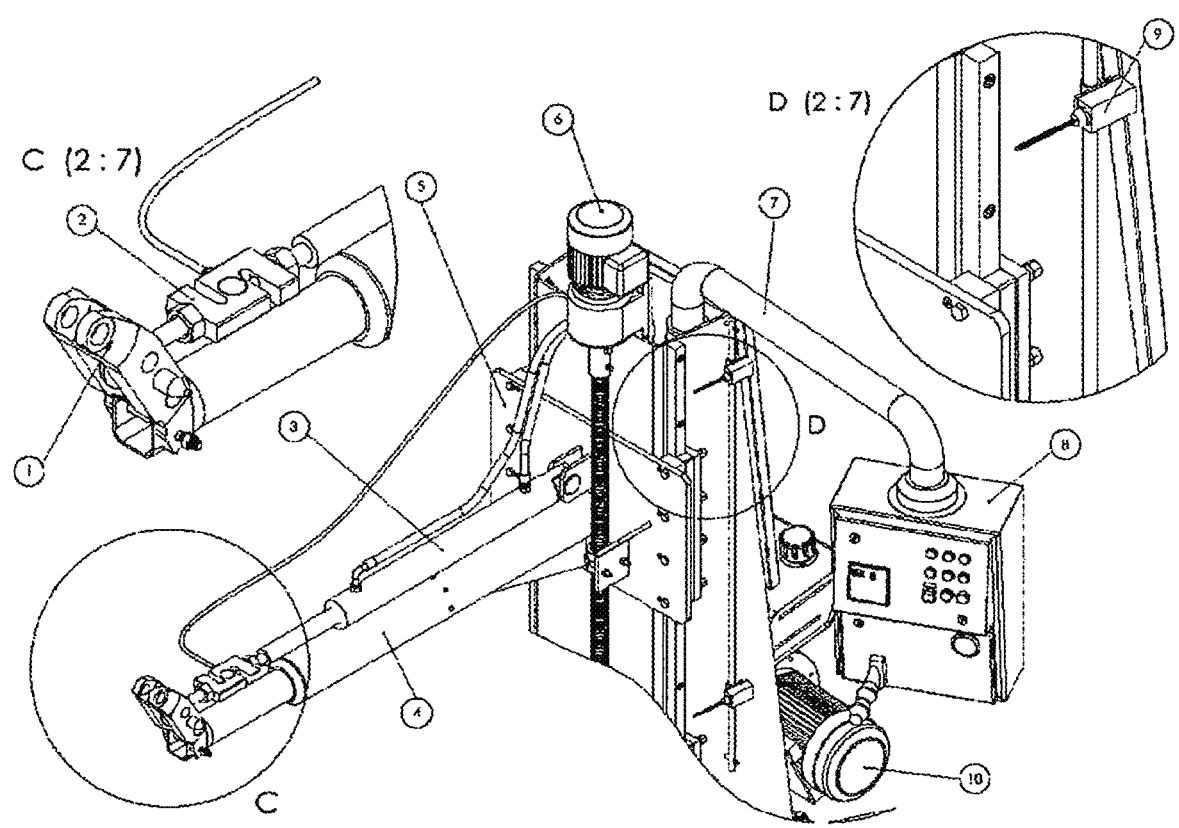
Figure (1-3)

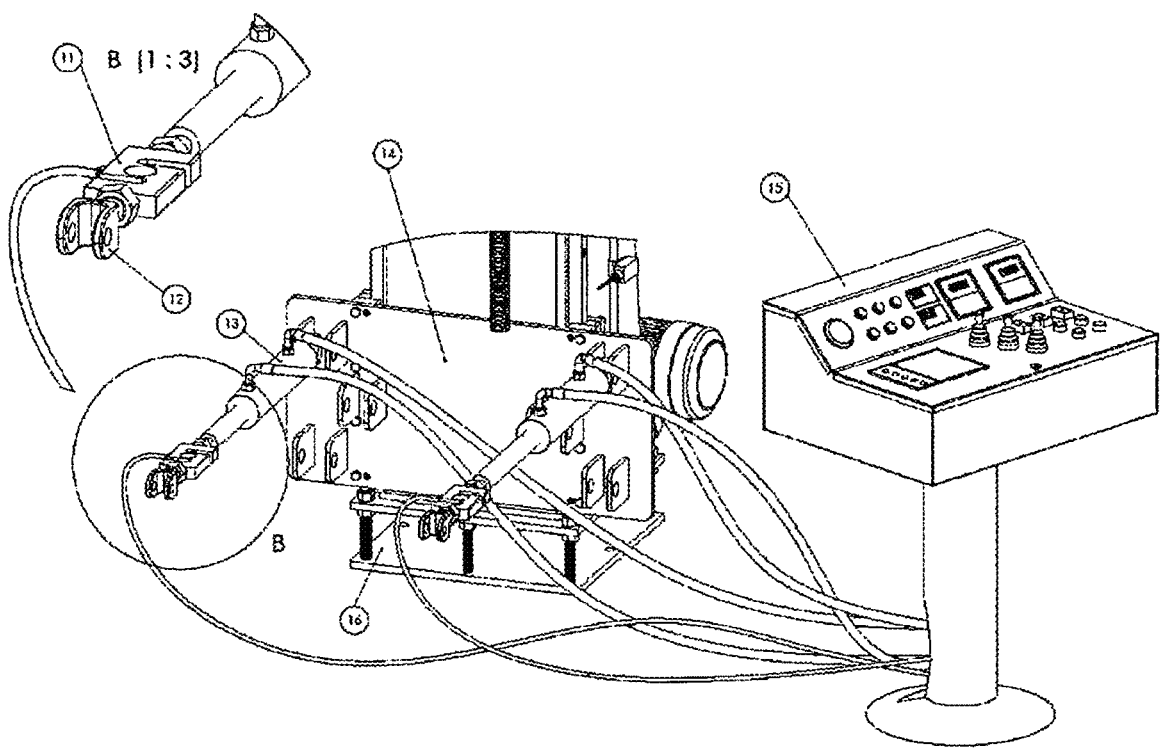
Figure (1-4)

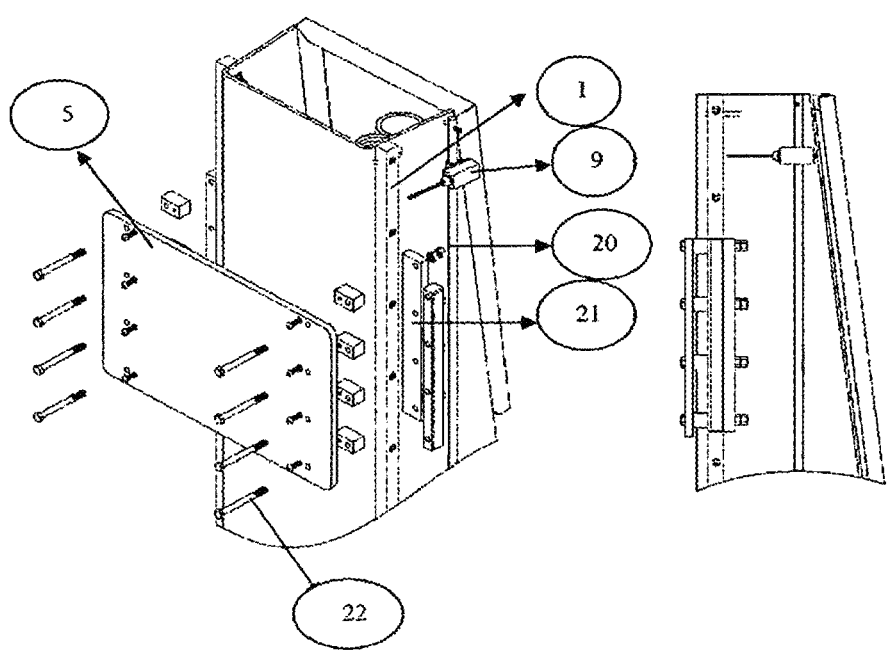
Figure (1-5)

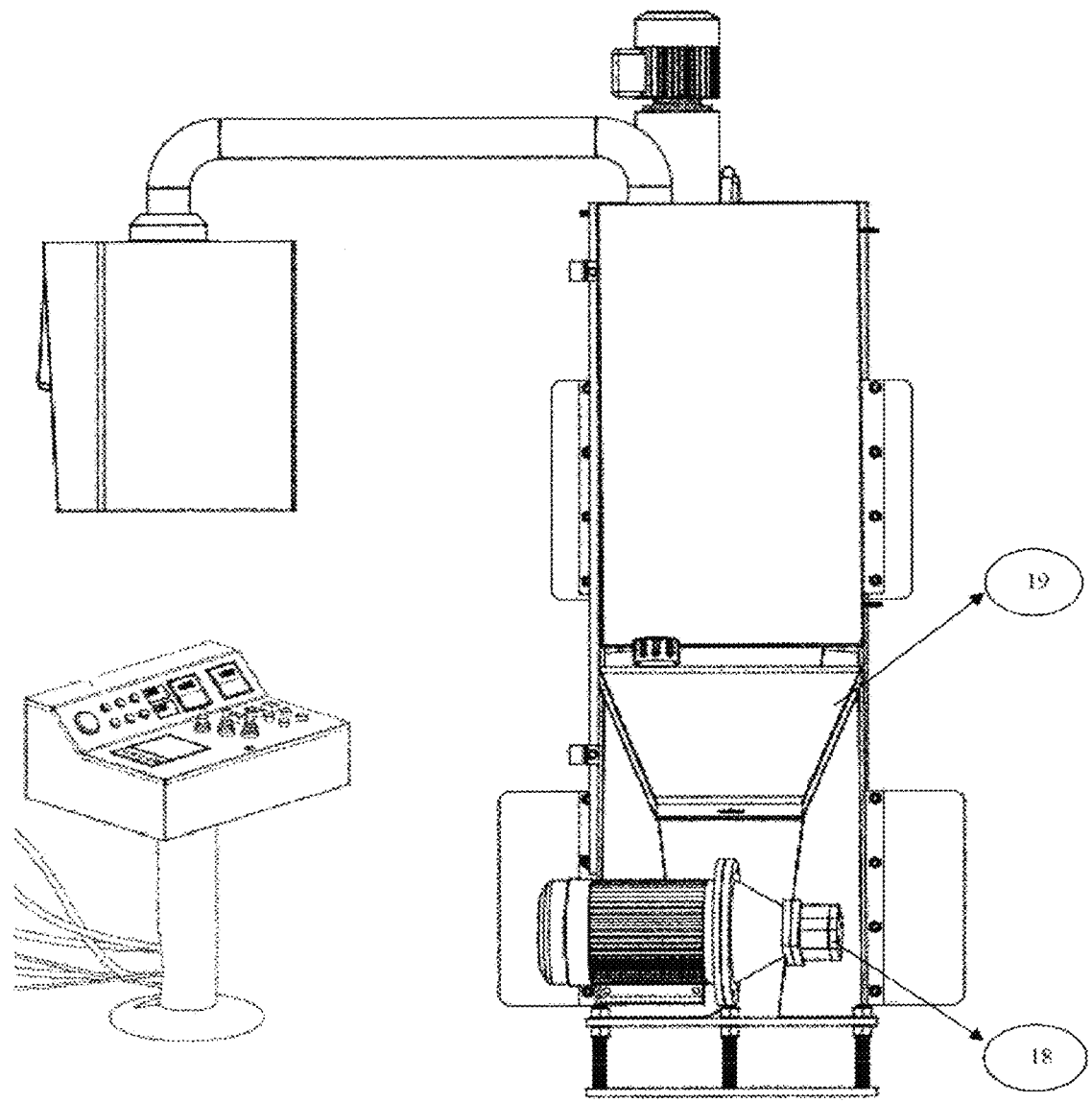
Figure (1-6)

TRACTOR DRAFT CONTROL TESTING DEVICE

BACKGROUND OF THE INVENTION

Draft control of tractor hydraulic system is not tested on the production line in most tractor-manufacturing companies of the world; even in the limited number of countries where it is tested, this is carried out as field test; there is no device which can show the function of the draft control of tractors.

In most tractor-manufacturing companies, no test is done on this part of the tractors. Therefore, because of the importance of the function of the draft control system of tractors, a device which can test this system of tractor on the production line seems essential.

SUMMARY OF THE INVENTION

In the present invention has overcome all the shortcomings as mentioned in the background and the Tractor Draft Control. Testing Device has the capability of testing the draft control of hydraulic system of all types of tractors. By exerting pressure force, this draft control system tests small tractors; and for testing the draft control of large and modern tractors, this device exerts tracting force on the lower arms (will be explained later).

In order to measure the tracting force applied, at the point where the jacks are connected to the tractor, some loadcells are mounted, which shows the forces in which the draft control pressure is stimulated. In the tractors in which the draft control sensor is located on the middle arms, loadcells are sensitive to the pressure force, and in the tractors in which the draft control sensor is located on the lower arms, the loadcells are sensitive to the tracting force.

Load cells send the forces exerted by the jacks at any time to the analyst of the device. By analyzing the data, the proper or improper function of the draft control is displayed to the analyst.

BRIEF DESCRIPTION OF THE DRAWINGS

FIG. 1-1, displays schematic of the designed system.

FIG. 1-2, displays different parts of the system.

FIG. 1-3, shows the upper components of the device mainly used in testing tractors in which the draft control system is located in the central arm.

FIG. 1-4, shows the lower components of the device mainly used in testing tractors in which the draft control system is located in the side arms; also, in this FIGURE the foundation and steering box (B) are seen.

FIG. 1-5, shows the components of the positioning plate A, microswitches, and the rails.

FIG. 1-6 shows the positioning of hydraulic pumps and the oil tank.

VARIOUS COMPONENTS OF THE TRACTOR DRAFT CONTROL TESTING DEVICE

Figures 1, 2, 3, 4, 5, 6, 7:
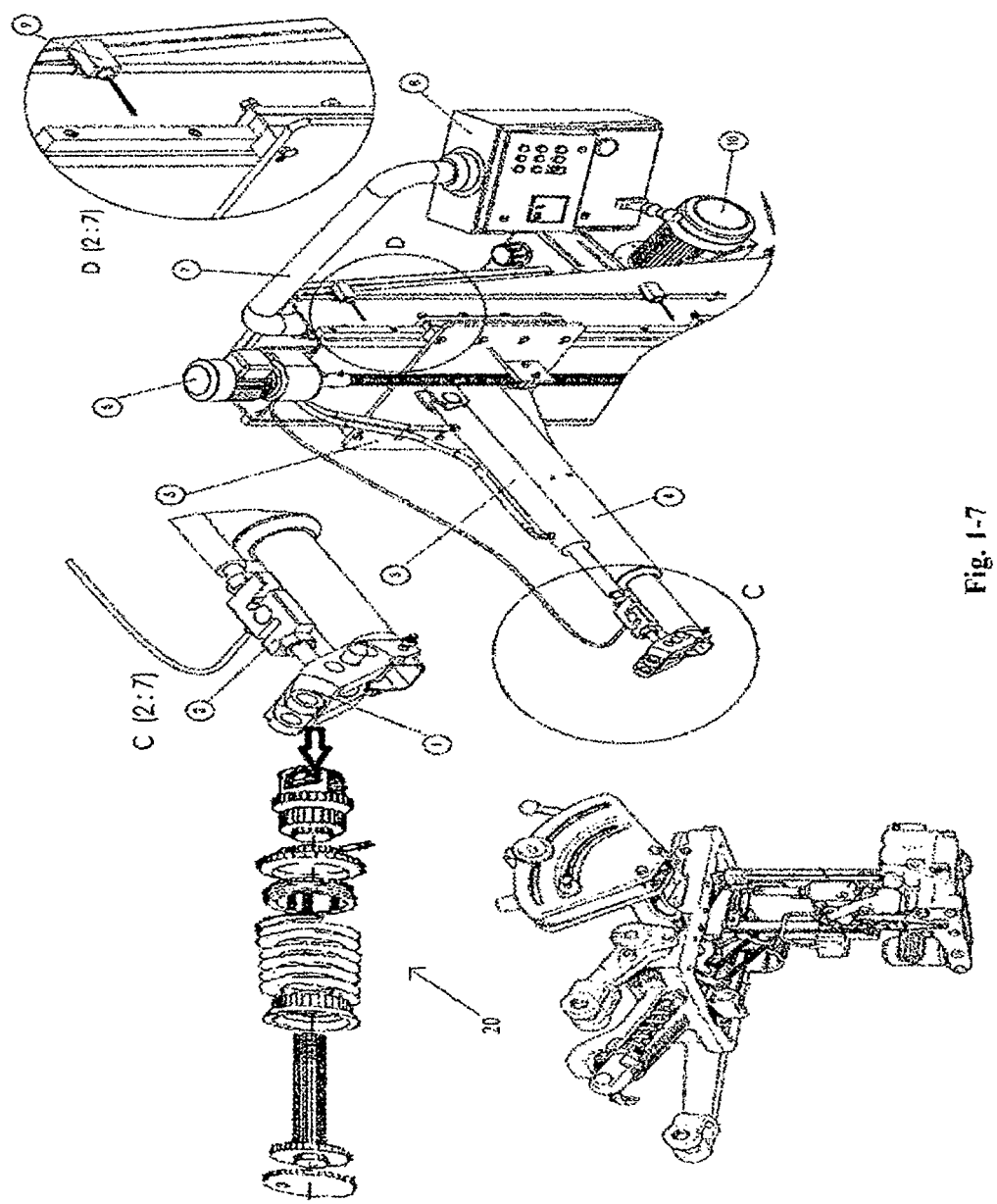

The Tractor Draft Control Testing Device is composed of the following two parts:
1. Mechanical Components
2. Software Components The mechanical components include the main parts of the device, electrical hydraulic circuits which do the testing function by coordinating; FIGS. 1-1 and 1-2 show the full view of the device and the components.

The components of the Draft Control Testing Device shown in figures have the following duties:

1 Draft Control Ladder; this part is connected to a tractor Draft Control sensor (not shown).

2 Pressure loadcell; measures the pressure forces exerted on the tractor. Draft Control sensor.

3 Central Hydraulic Jack; this jack exerts force on the draft control spring

4 Jack guide; prevents from diverting the jack direction at the time of exerting pressure force.

5 Positioning plate (A); the Central hydraulic jack 3 and the Jack guide 4 are mounted on this plate; this plate is adjustable vertically.

6 Electra gearbox; this part adjusts the height of the positioning plate 5.

7 Rotating arm; this arm, is mounted on the main skeleton of the device, carrying steering box 8, this arm is rotatable on either side.

8 The steering box; in the steering box, there are hydraulic distributors (not shown), electrical command circuits (not shown) as well as phase indicators (not shown).

9 Microswitch; this part, which is a double one, determines the moving range of the Positioning plate 5.

10 Electromotor; hydraulic pumps 18 and hydraulic circuits (not shown), are supplied by this electromotor.

11 Tracting loadcell; this loadcell measures the tracting forces exerted on lower arms of a tractor at time of test through the lower hydraulic jacks 13.

12 Connecting hook; connects the lower hydraulic jacks 13 to the lower arms of a tractor at the time of testing.

13. Lower hydraulic jacks; these jacks are of the double-sided type used in tractors in which the draft control is located in the lower arms of any tractor at the time of testing; the tracting loadcells 11 are fastened on this jack.

14 Positioning plate (B); the lower hydraulic jacks 13 are mounted on this part.

15 The steering box; in this part, the software of the device and hydraulic distributors are positioned.

16 Foundation; the Tractor Draft Control Testing Device is fixed on the ground by the foundation; this part has openings (not shown) through which the device is harnessed to the around.

17 Rail; the Positioning plate (A) 5 and positioning plate (B) 14 which are adjustable vertically, move on this rail.

18 Hydraulic pump; the hydraulic pump supplies the force required for the hydraulic systems at the time of testing; the positioning place of the pump is seen in FIG. 1-6.

19 Oil Tank; the oil needed for the hydraulic systems (jacks and the rest) is reserved in this part.

20 Draft Control Spring; a spring that is simulated by central hydraulic jack 3 and receives the exerted force to stimulate the tractor for further testing

DETAILED DESCRIPTION OF THE INVENTION

Draft Control is one of the most important components of hydraulic systems of a tractor; this system can protect the tractor and the soil-kneading instruments working inside the soil against the strokes resulting from the stone or weeds with strong roots. The existence and function of this system is of great significance for every tractor.

Proper function of a draft control system is an issue which has to be tested before it is sold and used. In tractors with much lower strengths that use light soil-kneading instruments, the draft control sensor is located in central arm of the tractor. By stimulating the draft control spring 20 (see FIGS. 1-7) at the back of this arm, a collection of connections and consequently a distributor of hydraulic pump 18 can be stimulated and the central arm can be lifted off the ground.

It is worth mentioning that the central arm of these tractors when under a pressure force, require the function of the draft control system. In advanced tractors with very high powers, the draft control sensor is located in the lower arms of the tractor. By exerting tracting force on one of these arms, the draft control system can be tested in terms of functioning.

Tractor Draft Control Testing Device:

This device has the capability of testing the draft control of all types of tractors; by exerting pressure force, the draft control system tests small tractors. For testing the draft control of large and modern tractors, this device exerts tracting force on the lower arms of the tractors. At a joint connection of the jacks to the tractor, some pressure loadcells 2 are mounted, wherein the forces in which the draft control pressure is stimulated is displayed. In the tractors in which the draft control sensor is located in the central arm (not shown), the pressure loadcells 2 are sensitive to pressure force, and in the tractors which the draft control sensor is located in the lower arms (not shown), the pressure loadcells 2 are sensitive to tracting forces.

Loadcell 2 sends the data about the exerted forces by the jacks at any time to the analyst of the device. By analyzing the data, the analyst displays the proper or improper function of the draft control to the user.

For testing operations, this device requires systems including electrical circuits, hydraulic circuits, analyzing software and hardware components.

Detailed Description of Different Embodiments

Considering the above figures, we will now explain these components in detail:

Draft Control Ladder 1, is used for testing tractors in which the draft control sensor is mounted on a central arm of the tractor; depending on the type of tractor, this part can be adjusted. The ladder is mounted on Jack guide 4 which acts as a hinge at a joint. The upper part of the ladder is connected to the tractor with a pin (not shown); in the center of the ladder, a pressure loadcell 2 is mounted.

Pressure loadcell 2; is connected to a hydraulic jack 3, on one side, and to the draft control ladder 1, on the other side. This part measures the pressure forces exerted on the Tractor Draft Control sensor by the jack, and sends the data obtained to the system analyst. The loadcell 2, used in this part is of an S type; one of the characteristics of these loadcells are that they do not show sensitivity to the unlevel surfaces.

Central hydraulic jack 3, this jack is connected to positioning plate (A) 5, on one side, and to the loadcell 2, on the other side. This jack is of two-sided type with at least about 120 centimeters of length and effective diameter of at least about 4 centimeters wide.

Jack guide 4, is connected to the positioning plate (A) 5, on one side, and is loose on the other side. This part is designed like a telescope; when the central hydraulic jack 3 needs to be opened, the length can be extended. At the time of testing, this part supports the central hydraulic jack and prevents from diverting the direction of the jack at the time of exerting pressure force. At the top part of the jack guide 4, ladder 1 is mounted; in this way, at the time of testing, the ladder 1 is placed in the tractor draft control sensor, and the end of the guide 4 leans against the tractor.

Positioning plate (A) 5, is the point where the central hydraulic jack 3 and the Jack guide 4 are mounted; it can be adjusted vertically by the electrogear box 6; depending on the ground surface, the height of this plate is adjustable. This adjustability enables the whole system to test all types of tractors with various heights. The range of the movement of the said plate is determined by two up and down microswitches 9; depending on the type of tractor, this range can be adjusted.

Electrogear box 6, this part supplies the power needed for adjusting the Positioning plate (A) 5. The outlet of Electrogear box 6 is connected to power screws (not shown) which vertically adjusts the Positioning plate (A) 5, the power of the said Electrogear box 6 is ½ hp.

Rotating arm 7, carries the steering box (A) 15, and makes it accessible; this arm is connected to the body of the rotating device at the joint of connection which rotates around the main skeleton of the device for 270 degrees; this facilitates the testing operations tractor on both sides.

The steering box (A) 15: Mounted on rotating arm 7; at the joint of the connection, this part rotates around itself on a line perpendicular to the ground at 180 degrees. Depending on the test requirements, the user can change the position. This box contains some electrical circuits, hydraulic distributors, central jack as well as the phase indictors.

Micro switches 9: This part (two micro switches) are mounted on rail 20, shown in FIG. 1-5. These micro switches move on rails and are adjustable. Micro switches control the moving range of the Positioning Plate (A) 5 and do not allow this plate to move up or down more than what has been determined.

Electromotor 10: The electromotor in the draft control testing device supplies the power needed for generating hydraulic pump 18. The hydraulic pump 18 also supplies hydraulic power of the hydraulic circuit. This electromotor is fed by three-phase electricity and has 4 hp power; the electromotor is positioned at the back of the device.

This device has two tracting loadcells 11 mounted on the lower jacks. These loadcells are connected to lower jack 13 on one side and to connecting hook 12 on the other side. This loadcell measures the tracting forces exerted on the lower arms at time of testing and sends the data obtained to the analyzing system. The loadcell used in this part is of (S) type. One of the characteristics of these loadcells are, that they do not show sensitivity to the unlevel surfaces, and these surfaces have no effect on their performances. It is worth mentioning that the said loadcells are used for testing tractors in which the tracting control sensor is on the lower arms.

Connecting hooks 12: These hooks are fastened on the tracting loadcells 11, where they connect the device to the lower arms. These hooks are joined to the arms with a pin.

Lower hydraulic jacks 13: Lower jacks are mounted on positioning plate (B) 14; they are of double-sided type used for exerting tracting force on the lower arms of the tractors. Some of the tracting loadcells 11 are mounted at the end of these jacks.

Positioning plate (B) 14: Is the point where the lower jacks 13 are connected. There are three connecting hooks 12 on both sides of this plate which are tested depending on the type of tractors; and the jacks are placed at proper places.

The steering box 8: This is positioned on the ground by a foundation; this box is composed of hydraulic distributors, lower jacks 13, analysis and phase indicators.

Foundation 16: This is used to position the device at place. The foundation must bear the forces exerted on the device by the hydraulic system at the time of testing the hydraulic system.

Rail 17: Two rails are mounted on both sides of the device. These rails are stationed perpendicularly and extend throughout the length of the device. They also guide the positioning plate (A) 5 on a straight line at the time of movement. The positioning plate (A) 5 is mounted on the rails 17 with screws 22 and the fastening gib 21.

The hydraulic pump 18 supplies the force required for exerting force by the jacks (13 and 3). The pump used has a 180 bar pressure and 5 liter db per minute; this pump is coupled at the back of the device and on the electromotor.

Oil Tank 19: Supplies the oil needed for the hydraulic components; this is located on the hydraulic pump 18 and behind the device.

Microswitch Rail 9: is mounted parallel with rail 17; as the name denotes it is the point where the microswitches are located. This rail is designed in a way that microswitches can be adjusted so that they are able to adjust the positioning plate (A) 5 placed on them; that is, the more microswitches on rails are closer together, the moving range of the plate is less, and the more they are far from each other, the less the moving range of the plate.

General Function of the Draft Control Testing Device for all Types of Tractor

This device is designed in a way that it can test the draft control of all types of tractors. The function of the draft control testing device can be classified into two parts:

Testing small tractors (the draft control sensor is on the central arm). In these types of tractors, the draft control sensor 1 is on the central arm. In order to test this system, this part must be stimulated. At first, the tractor must be placed in front of the device, then, depending on the height of the draft control sensor 1 from the ground, and the type of the tractor, the positioning plate (A) 5, can be adjusted by the electrogearbox 6 vertically.

In order to adjust the positioning plate, it must moves up and down on rail 17. This rail is a guide for the positioning plate; the movement of the plate is controlled by up and down microswitches 9. In fact, these microswitches do not allow the plate to move up or down more than what it is required. By adjusting the positioning plate depending on the type of the tractor, ladder is located in the tractor draft control sensor 1.

After the ladder is conformed in this section, by applying pressure force on the ladder, central jack 3 stimulates the tractor draft control 1. Pressure loadcell 2 is mounted between the ladder and the jack; this loadcell is sensitive to pressure force. When central jack 3 exerts force, this loadcell measures the forces exerted. The pressure of hydraulic system is supplied by electromotor 10 and pump 18. By applying pressure force by central jack 3, loadcell 2 measures the force at any time until the time of function of draft control 1, and sends it to the steering box (B) 15 to be analyzed by the computer.

The steering box 15 includes analyst computer, indicators, and hydraulic valves. Simultaneous with the exertion of force by central jack 3, jack guide 4 which is designed like a telescope, opens outwards to guide the jack against force vibrations.

Testing large tractors (the draft control sensor is on the lower arms). In these tractors, the draft control sensor 1 is on the lower arms. In order to test this system, this part must be stimulated. In order to start first, the tractor must be placed in front of the device, then, the connecting hooks 12 are connected to the lower arms.

At the back of these hooks 12, tracting loadcells 11 which are sensitive to draft, are mounted. The other side of the tracting loadcells are connected to lower jack 13. This complex is positioned on positioning plate (B) 14. When the test starts, the user, via hydraulic values placed on steering box 15, causes the lower jacks 13 to exert tracting force on the lower arms of the tractor.

Simultaneously with the exertion of tracting force, the loadcells receive the forces data at any time until when the draft control 1 starts working and sends those data to the analyzing device. The analyst, in turn, analyzes the forces received from the loadcells and compares the force in which the tracting force is stimulated with the base force, and announces the result to the user.

The materials used in this device include: st-37, 3t-52 steels, with various thickness; since rails 17 and 20 and fastening gib 21 are subject to abrasion, electroplated steel has been used. The power of the electro gearbox used is ½ hp; and the electromotor used has 4 hp.

It is understood that the above description and drawings are illustrative of the present invention and that changes may be made in materials, design and programming without departing from the scope of the present invention as defined in the following claims.

The invention claimed is:

1. A tractor draft control testing device for draft control test of hydraulic system of all types tractors comprising:
   a draft control ladder; connected to a tractor draft control sensor;
   a pressure loadcell which measures pressure forces exerted on said tractor draft control sensor;
   a central hydraulic jack; exerting a force on a draft control spring;
   a jack guide, preventing diversion of direction of said central hydraulic jack during exertion of said pressure forces;
   a first positioning plate, wherein said central hydraulic jack and said jack guide are mounted on said first positioning plate and wherein said first positioning plate is adjustable vertically;
   an electro gearbox; adjusting a height of said first positioning plate;
   a rotating arm; carrying a steering box and capable of rotating left to right;
   multiple microswitches determining movement range of said first positioning plate;
   an electromotor;
   tracting loadcells; measuring tracting forces exerted on lower arms of said tractor at time of test through lower hydraulic jacks;
   connecting hooks; fastened on said tracting loadcells, where they connect said device to said lower arms;
   lower hydraulic jacks; wherein said tracting loadcells are fastened to said lower hydraulic jacks;
   a second positioning plate, wherein said lower hydraulic jacks are mounted to;
   a rail wherein said first and second positioning plate vertically move and are adjusted on to; and
   a hydraulic pump.

2. The tractor draft control testing device of claim 1, wherein multiple of said loadcells are mounted on different sections of said tractors; wherein said draft control test is performed via exerting said forces on said tractors; wherein said forces are pressure force exerted on smaller sized tractors and wherein said forces are tracting force exerted on larger and modern tractors.

3. The tractor draft control device of claim 2, wherein said draft control test is performed on site of a production line.

4. The tractor draft control device of claim 3, wherein said pressure loadcell is connected to said central hydraulic jack at one end and to said ladder from another end.

5. The tractor control device of claim 4, wherein said central hydraulic jack is connected to said first positioning plate at one end and to said pressure load cell from another end.

6. The tractor draft control device of claim 5, wherein said jack guide is connected to said first positioning plate at one end and is loose at an opposite end and wherein said jack guide comprises a telescopic feature and is extendable in length when said central hydraulic jack must be opened.

7. The tractor draft control device of claim 6, wherein said first positioning plate is adjusted vertically, accommodating test of all types of said tractors and wherein said micro switches are mounted on said rails, and control range of movement of said first positioning plate and wherein said lower hydraulic jacks are mounted on said second positioning plate.

8. The tractor draft control device of claim 7, wherein said first positioning plate is adjusted based on a height of said draft control sensor.

9. The tractor draft control device of claim 8, wherein when said central hydraulic jack exerts force, said loadcell measures said force exerted at any time and sends gathered data to said steering box is analyzed by computers.

10. The tractor draft control device of claim 9, wherein in small sized tractors said draft control sensor is located on said small sized tractor's central arm; and wherein a height of said first positioning plate is adjusted by an electrogearbox and moving up and down along said rail in order to match said draft control sensor's height from the ground, wherein a draft control ladder is then mounted on said draft control sensor; and wherein said central arm is stimulated by applying pressure force on said draft control ladder, where said central jack stimulates said tractor draft control sensor; said pressure loadcell that is mounted between said draft control ladder and said central jack measures forces exerted by said central jack at any time until when said draft control sensor is ready to work, wherein said exerted force analyzed by a computer at all times and wherein said jack guide comprises a telescopic design that opens outwards guiding said central jack against vibrations of said exerted forces.

11. The tractor draft control device of claim 9, wherein said draft control sensor is located on a lower arm of large tractors; wherein said large tractors must be must be placed in front of said device, and then said connecting hooks are connected to said lower arms; wherein at a back of said connecting hooks, tracting loadcells that are sensitive to draft, are mounted; and wherein on another side of said tracting loadcells are connected to a lower jack; wherein at a time of said test hydraulic values placed on a steering box causes said lower jacks to exert tracting force on said lower arms of said large tractors; and wherein said tracting loadcells receive said tracting forces data at any time till when said draft control sensor starts working and sends those data to an analyzing device; wherein data of said tracting forces received from said loadcells will be compared with a base force.

* * * * *